United States Patent

[11] 3,584,643

| [72] | Inventor | Lawrence A. Burke<br>Royal Oak, Mich. |
|---|---|---|
| [21] | Appl. No. | 868,408 |
| [22] | Filed | Oct. 22, 1969 |
| [45] | Patented | June 15, 1971 |
| [73] | Assignee | Standard International Corporation<br>Andover, Mass. |

[54] FLUENT MATERIAL LEVEL CONTROL SYSTEM
11 Claims, 1 Drawing Fig.

[52] U.S. Cl. ..................................................... 137/392,
73/304, 340/244
[51] Int. Cl. ........................................................ G05d 9/12
[50] Field of Search............................................. 137/386,
389, 391, 392; 73/304, 304 C; 340/244 C

[56] References Cited
UNITED STATES PATENTS

| 2,787,783 | 4/1957 | Storm......................... | 340/244 C |
| 2,948,183 | 8/1960 | Maloy et al.................. | 137/392 X |
| 3,181,557 | 5/1965 | Lannan, Jr.................... | 137/391 |
| 3,340,892 | 9/1967 | Holland....................... | 137/392 |
| 3,408,940 | 11/1968 | McGrogan ................... | 137/392 X |

*Primary Examiner*—M. Cary Nelson
*Assistant Examiner*—David R. Matthews
*Attorney*—Joseph Weingarten

ABSTRACT: A system for detecting, indicating, and controlling the level of a fluent material in a container. This system applies alternating current to two electrodes in a container, the electrodes being parts of a voltage divider included in a bridge network. A solid-state circuit controls a pump and motor in response to the output of the bridge network to regulate the level of the material in the container.

INVENTOR
LAWRENCE A. BURKE

FLUENT MATERIAL LEVEL CONTROL SYSTEM

FIELD OF THE INVENTION

This invention relates in general to level detection, indication and control systems and more particularly concerns a unique solid-state electronic system for regulating the level of a material within a container to maintain the material level between two predetermined values.

DISCUSSION OF THE PRIOR ART

Measurement of material level is commonly accomplished by any one or a combination of several means. Such measurement means may include ultrasonic, radiation, potentiometric, capacitance, and float operated systems. The output of these measurement systems may be used with electrical, mechanical, pneumatic or hydraulic means, or a combination of these, to provide indication of level and to control the level of the material being measured through actuation of a pump or some other suitable level adjusting device.

A significant drawback to several of the prior art devices is that they depend upon moving parts or complex electronic equipment, or both, with resulting high production costs and low reliability over long periods of operation. Use of such devices for consumer market applications, such as control of liquid level in soft drink carbonators, has been generally unsatisfactory due, in part, to the above enumerated disadvantages.

One system which has enjoyed some measure of success for such consumer market applications employs an electromechanical relay and associated moving contacts in conjunction with two electrodes immersed in the liquid. A significant drawback of this device is the fact that its sensitivity is limited to that provided by the electromechanical relay; consequently, large voltages must appear on the electrodes which may adversely affect the taste of the carbonated beverage. Many prior liquid level control devices which use immersed electrodes have suffered from the fact that direct current is used on the electrodes resulting in their rapid corrosion due to electrolysis, causing the eventual destruction of the system.

Furthermore, systems which use electromechanical relays as the final power control device are inherently subject to arcing problems if the load is inductive, as is usually the case.

SUMMARY OF THE INVENTION

Broadly speaking, the present invention comprises an automatic level control system having an operating life measured in years with high reliability through several million operating cycles The system contains an electrical bridge including two electrodes suspended at different levels within a container having an electrically conductive wall in contact with the fluid material therein. The material whose level is to be controlled may be liquid or solid, the only requirements being that it be electrically conductive and readily flowable. The material will be generally referred to herein as a fluid. An alternating voltage is applied to a voltage divider in the bridge which includes the electrodes and the container having liquid therein. The alternating voltage output of the bridge, which depends on the level of the liquid in the container, is applied to a circuit which exhibits hysteresis and which includes a silicon controlled rectifier (SCR).

This circuit operates a reed relay which in turn operates a power control device, such as a triac, which directly controls the operation of the fluid level adjusting means. The fluid level adjusting means may be a motor and pump, a valve operating device, or other means for controlling the flow of fluid into or out of the container, thereby operating to maintain the level of the fluid in the container between two predetermined values. Due to the hysteresis effect introduced into the SCR circuit, the state of operation of the level adjusting means is not uniquely dependent upon the instantaneous level of the fluid in the container, but depends upon the immediate past history of the fluid level.

The level control system constructed according to the principles of this invention has several advantages over the prior art. The reed delay, rather than being used to handle large amounts of electrical power with attendant bulkiness and low sensitivity, is used primarily to provide electrical isolation between the sensing and power control parts of the overall circuit, and thereby is operated at low power levels, with attendant small size, low cost, increased reliability, and long life. The power control device is entirely solid-state and inherently free of contact arcing problems common to systems using an electromechanical relay as a final power control means. With alternating current applied to the sensing electrodes, no electrolysis-caused corrosion of the electrodes occurs, even during extended operating periods. Because of the high sensitivity obtainable from the SCR circuit, the alternating current through the electrodes in normal operation is very small, thereby reducing to relative insignificance the possibility of any adverse effect upon the taste of the fluid. Because of the electrical bridge nature of the level sensing circuit, the system of this invention is substantially immune to most line voltage fluctuations, exhibiting satisfactory operation over a very wide range of line voltages. Furthermore, because the system is constructed to react to widely separated voltage outputs of the bridge network, it need not be highly selective. By providing for responses only to unambiguous signals, the result is a highly stable and reliable control system.

Although this system is useful for many purposes, it is specifically applicable to beverage vending machines using carbonated water.

BRIEF DESCRIPTION OF THE DRAWING

A complete understanding of the invention and its features and advantages will become apparent from the following detailed description taken in conjunction with the accompanying drawing which is a schematic diagram of a system constructed in accordance with the principles of this invention.

DESCRIPTION OF THE REFERRED EMBODIMENT

Figure 1:
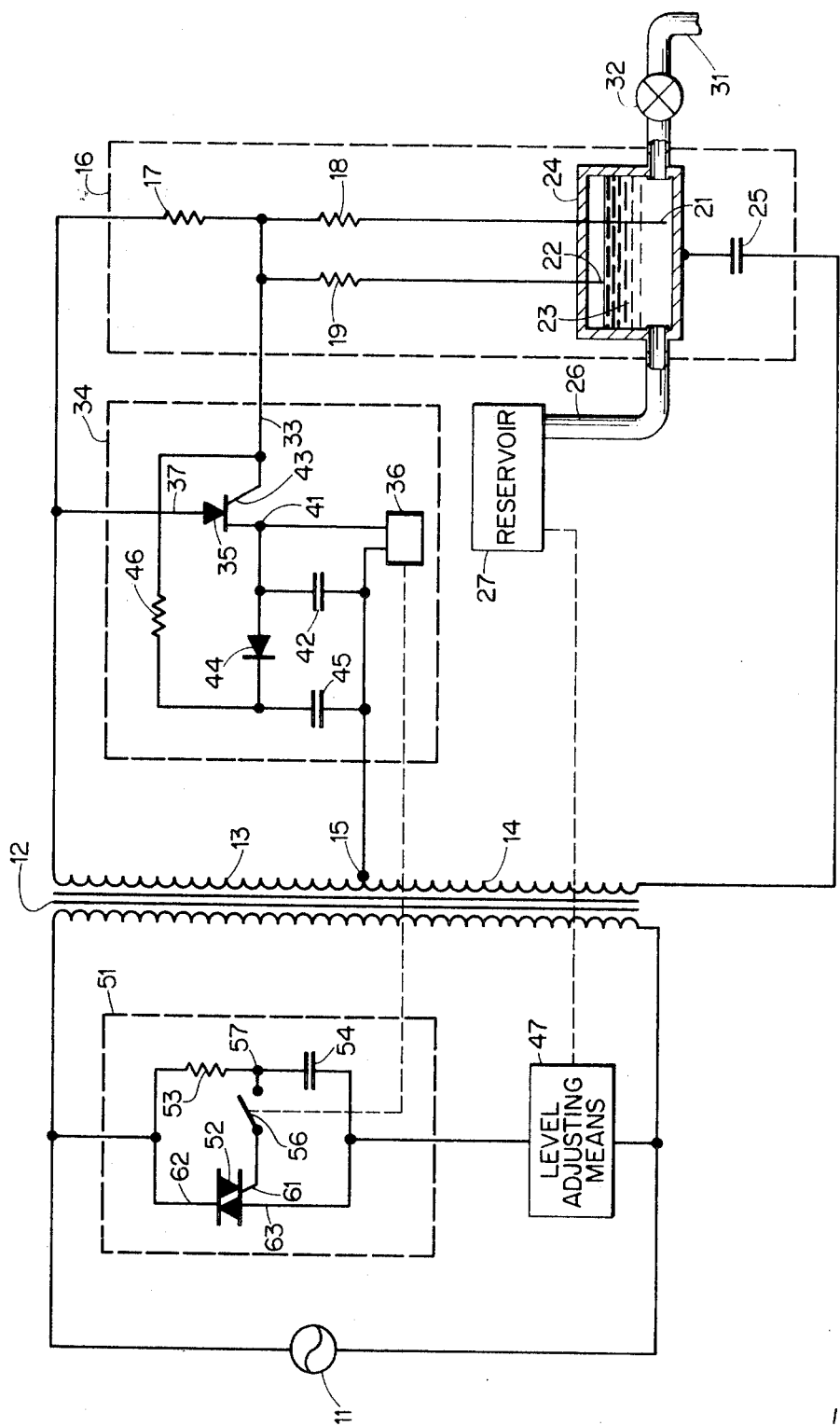

This level control system is powered by a conventional source of alternating electrical current of the common 115 volt, 60 Hz. type indicated by power source 11 in the drawing. The 115 volt line voltage is transformed by stepdown isolation transformer 12 providing equal and opposite polarity voltages on output windings 13 and 14 with respect to the transformer centertap 15. These output windings form two arms of an electrical bridge circuit and their voltages serve to excite the other two arms of the bridge which together form voltage divider 16. The voltage divider network includes resistors 17, 18, 19, electrodes 21 and 22, the electrical impedance of the fluid 23, container 24 and capacitor 25. Electrodes 21 and 22 are electrically insulated from the walls of the container. Container 24 is normally equipped with supply pipe 26 from reservoir 27 and outlet pipe 31 controlled by valve 32. It should be noted that the functions of pipes 26 and 31 may readily be reversed so that the fluid is removed by pipe 26 and supplied through pipe 31. Fluid 23 within the container is electrically conductive, as are the walls of the container 24 which are connected between capacitor 25 and fluid 23. The output of the bridge, comprising transformer windings 13 and 14 connected across voltage divider 16, is a voltage developed between electrical conductor 33 and transformer centertap 15.

Threshold detector circuit 34 includes a silicon controlled rectifier (SCR) 35, relay coil 36 (which is preferably part of a reed relay) and a feedback circuit. Anode 37 of the SCR is connected to transformer output winding 13, cathode 41 is connected to a parallel combination of capacitor 42 and relay coil 36, the other end of the parallel combination being connected to transformer centertap 15, and gate 43 is connected to voltage divider output conductor 33. The feedback circuit includes diode 44 and capacitor 45 connected in series between SCR cathode 41 and transformer centertap 15, and resistor 46 connected between SCR gate 43 and the junction of diode 44 and capacitor 45. The function of the feedback circuit is to supply a small positive current to SCR gate 43 so that the SCR will tend to remain in the conducting state after it is initially triggered by applied alternating current. Thus the conventional SCR switching circuit has, by the addition of a feedback network, become a circuit which exhibits hysteresis, functioning in a manner somewhat similar to that of a Schmitt trigger. This characteristic and its application to this circuit will be fully discussed below.

On the input side of transformer 12 are level adjusting means 47 and power control means 51 which are series connected across power source 11 in parallel with the input winding of the transformer. Power control means 51 may include any suitable device capable of switching large alternating currents, its switching being controllable by a relatively small voltage. The switching device may be termed a bidirectional alternating current switch and is preferably a triode AC switch 52, commonly referred to as a triac. A pair of inverse parallel connected silicon controlled rectifiers would also be satisfactory in place of triac 52. The series combination of resistor 53 and capacitor 54 is connected in parallel across triac 52, with gate 61 of the triac being connected through normally open contact 56 to junction 57 between the resistor and capacitor. Contact 56 is controlled by relay coil 36. When contact 56 is closed, triac 52 is triggered to a conducting state because of the voltage supplied to gate 61 and power is supplied to level adjusting means 47 to cause the level of fluid 23 in container 24 to be appropriately changed, either by adding fluid to or removing fluid from the container. When contact 56 is open triac 52 is not conducting and level adjusting means 47 is off.

Resistor 53 has a dual purpose; one as a triggering and current limiting resistor for gate 61 of triac 52 and the other as a part of a conventional commutating network which includes capacitor 54. This type of commutating network is necessary for proper response of triac 52 if level adjusting means 47 is inductive, which is normally the case because level adjusting means 47 is most often a motor which operates with a pump or valve control device to control the fluid level. The level adjusting means is shown diagrammatically as being connected to reservoir 27, but it should be understood that this representation of control function and associated structure denotes any conventional means for raising or lowering the level of the fluid in container 24. In any event, for expository purposes it will be assumed that the level adjusting means includes a motor 47 which is controlled by power control means 51. It is apparent that this system may either replenish a container when the fluid drops below a given level or it may remove fluid from the container when the fluid rises above a given level. A slight modification of the system, such as replacing the normally open relay contact with a normally closed relay contact, would suffice to change the system operation from one of fluid replenishment to one of fluid removal. However, this system will be described as a replenishment means, with fluid being conventionally removed from container 24 through pipe 31.

Through the use of transformer 12 and relay 36, the low voltage level detecting portion (including container 24) of the system is maintained isolated from the high voltage power and control portion of the system. The current actually passing through fluid 23 is very low so that there is little or no change in the taste of the fluid. It can readily be seen from the above designation that a small voltage is very safely used to control full line voltage to the level adjusting means, all as part of the same solid-state operating system.

The detailed operation of the novel level control system of this invention, together with some examples of component values, will now be set forth. The resistance values of voltage divider network 16 are chosen so that the bridge is balanced, that is, there is essentially no potential difference between conductor 33 and centertap 15 of the transformer, when low electrode 21 is immersed in fluid 23 and high electrode 22 is uncovered. Typical values of voltage divider network 16 parameters pertinent to operation of the system are: resistor 17, 39 $k\Omega$; resistor 18, 39 $k\Omega$; resistor 19, 3.9 $k\Omega$. The resistance of fluid 23 from an immersed electrode to container 24 is in the range of 100—5000$\Omega$. Even this relatively large range has no effect upon operation of the system because while a typical triggering voltage for SCR 35 is about 0.5 volts, the near balance output of the bridge at conductor 33 is 0.2 volts or less. Capacitor 25, which blocks direct current from flowing through the electrodes thereby preventing their corrosion by the process of electrolysis, is typically a 1 $\mu f$ capacitor.

Assuming that motor 47 has been off for some time and that low electrode 21 is covered by liquid 23 while high electrode 22 is uncovered, any DC components of voltage that might have been present on capacitors 25, 42 and 45 during previous operation of the motor will have been discharged. The cathode 41 of SCR 35 will then be at the same potential as transformer centertap 15. Thus, the gate-to-cathode voltage of SCR 35 is approximately zero or is at least substantially less than the required triggering voltage so that the SCR does not conduct; no current flows through relay coil 36, relay contact 56 is open, and triac 52 is not conducting. Therefore, no current flows through the motor 47 and no liquid is pumped into container 24 through pipe 26. The circuit is quiescent.

When valve 32 is opened to allow fluid to flow from container 24 through pipe 31, the level in container 24 falls, eventually uncovering low electrode 21. The bridge is then severely out of balance and a signal of several volts is applied to gate 43 in phase with the voltage on anode 37 so as to cause SCR 35 to conduct during each positive half-cycle of voltage applied to the anode, thereby charging capacitor 42 to the peak voltage appearing on the anode. The value of this peak voltage is set by the turns ratio of transformer 12 to be approximately 17 volts. This 17 volt half-sinusoid, of course, also appears across coil 36 and is sufficient to energize the relay causing contact 56 in power control means 51 to close and connect resistor 53 between anode 62 and gate 61 of triac 52. Capacitor 42 acts to smooth the voltage applied to coil 36 so that even though SCR 35 acts as a half-wave rectifier, the coil is continuously energized and its contact 56 remains closed so that triac 52 conducts uninterruptedly. Full wave triggering of triac 52 then occurs in standard fashion, applying the full line voltage to motor 47. The motor then proceeds to supply fluid to container 24 from reservoir 27 so that the level of the fluid in container 24 begins to rise.

Simultaneously with the initial appearance of a charge on capacitor 42, diode 44 becomes forward biased and a voltage is developed on capacitor 45 that is substantially equal to, but due to the drop through diode 44, slightly less than the voltage on capacitor 42. This charge on capacitor 45 is coupled to gate 43 of SCR 35 through resistor 46, causing a positive component of voltage to be developed at the gate which will continue to trigger the SCR even after motor 47 has caused the level of fluid in container 24 to rise sufficiently to cover electrode 21 and thereby balance the bridge. Proper operation of this "hold-on" feedback circuitry requires that the time constant of the parallel combination of coil 36 and capacitor 42 be slightly less than the time constant of capacitor 45 and resistor 46 and that both be satisfactorily related to the period of the alternating power source 11 so that the above-described operation may be effected. That is, capacitor 42 must be capable of being charged during each conducting half-cycle of SCR 35. For a 60 Hz. power source, example component values that satisfy these requirements are: capacitor 42, 50$\mu f$; capacitor 45, 1 $\mu f$; resistance of coil 36, 150$\Omega$; resistor 46, 10 $k\Omega$. With the proper time constant relationship, the voltage across relay coil 36 rises to 17 volts during the positive half-cycles and may drop as low as 7 volts during the negative half-cycles of gate voltage. However, by providing a relay which is operative at 4 volts and with capacitor 45 still charged with up to 10 volts, the system continues to operate and maintain triac 52 conducting and relay coil 36 energized.

As the fluid level continues to rise, the state of circuit operations just described pertains until the fluid makes contact with high electrode 22. Electrically, resistor 19 (which is relatively small) now appears in parallel with resistor 18 (which is relatively large) and this parallel combination is in series with resistor 17 which has approximately the same resistance as resistor 18, with the result that the bridge is again thrown severely out of balance. However, the relatively large voltage (approximately 11 v.) now appearing at gate 43 is 180° out of phase with the voltage on anode 37 of SCR 35, thus preventing the SCR from conducting. Further, this gate voltage is of such polarity as to override the hold-on voltage fed back through resistor 46, thereby reducing the voltage at gate 43 below the value needed to trigger SCR 35 (typically 0.5 volts). With SCR 35 prevented from conducting, the voltage across coil 36 rapidly decays to below the actuating value, contact 56 opens, and triac 52 ceases to conduct. Line voltage 11 no longer appears across motor 47, and fluid stops flowing into container 24 from reservoir 27. It is evident that as fluid is removed from the container and electrode 22 is again uncovered, the bridge is once more in balance. Since SCR 35 was turned off by the bridge output when the fluid contacted electrode 22, it remains off throughout the midrange of fluid level because there is essentially no bridge output. The voltage at gate 43 of SCR 35 then remains of such a magnitude and polarity that the SCR remains nonconducting until the liquid level in container 24 once again falls below low electrode 21, at which time the operating sequence just described is repeated.

The commutating network, which is necessary to ensure proper operation of triac 52, includes resistor 53 and capacitor 54, as explained previously. Typical values of these components are 100Ω for resistor 53 and 0.1μf for capacitor 54. With a 60 Hz. excitation, this combination appears as a 20 kΩ reactance and effectively blocks current from energizing motor 47.

Specifically concerning the property of hysteresis exhibited by threshold detector circuit 34, it must be understood that between the high and low extremes of fluid level, motor 47 will run or not depending upon whether the fluid level is increasing or decreasing. That is, when SCR 35 is off, the fluid must drop to a certain predetermined level before the circuit is triggered into operation. If, after the circuit is energized as a result of electrode 21 becoming uncovered, the fluid rises to a level greater than the predetermined triggering value, SCR 35 remains in an ON condition until a second, higher predetermined fluid level is reached. This action results because a DC voltage proportional to the voltage across coil 36 is fed back to gate 43 through resistor 46, thereby tending to keep SCR 35 in the ON condition. The threshold circuit is then turned off at the predetermined higher fluid level and will not be turned on again until the fluid once more drops to the first predetermined lower level. Stated another way, the SCR will conduct if it was conducting when the bridge became balanced and it will not conduct if it was not conducting when the bridge became balanced. As shown in the drawing, motor 47 is used to control the supply of fluid to container 24, usually by means of a pump located within, or connected to, reservoir 27. It should be noted that this system provides means for maintaining the fluid within the container between certain predetermined levels and does not refill the container each time fluid is removed therefrom. The length of time motor 47 operates during each cycle depends, of course, upon the size of the container and upon the capacity of the pump applying fluid to the container.

The particular configuration of the level control system shown in the drawing has a very important advantage over some previous systems in that it is substantially immune to line voltage fluctuations as far as its control operation goes. For example, if only the low electrode 21 is covered by liquid and the line voltage increases, the voltage at gate 43 remains at zero with respect to centertap 15; the bridge output at balance is independent of the AC line voltage. Because output winding 13 supplies power to the bridge circuit which is equal in value but opposite in phase to that supplied by output winding 14, the ratio of one to the other remains constant over the operating range of the system and the bridge output is always independent of fluctuations in power supply 11. Further, the triggering voltages of SCR 35 are sufficiently separated so that any foreseeable line voltage fluctuation would not change the operating state of the system nor would it cause ambiguities to occur.

It should be remembered that the operation described with particular values of circuit components is an example only and that wide variations in component values and in the components themselves are allowable within the principles of the invention herein disclosed. Changes and modifications which are within the scope of this invention will likely occur to those skilled in this art. For example, triac 52 may be controlled by a second resistor connected between anode 62 and relay contacts 56 and the connection at junction 57 would be removed. Thus, the commutating circuit would be separate and distinct from triggering circuit for gate 61.

What I claim is:

1. Apparatus for controlling the level of a fluent material in a container, said apparatus comprising:
    means adapted for applying alternating electrical power to said apparatus;
    an electrical transformer having its input winding connected across said power applying means and having centertapped output windings;
    a bridge circuit including the output windings of said transformer, said fluent material and said container, the electrical output of said bridge circuit being uniquely dependent upon the level of the fluent material in said container;
    a detector circuit adapted to produce first and second operating signals in response to the output of said bridge circuit, said operating signals being nonuniquely dependent upon the level of the fluent material in said container;
    power control means adapted to produce control signals in response to the output of said detector circuit; and
    means operative in response to said control signals for adjusting the level of the fluent material in said container;
    said power control means and said level adjusting means being connected to said power applying means.

2. The apparatus recited in claim 1, wherein:
    said detector circuit produces said first operating signal when the fluent material is below a first predetermined level and produces said second operating signal when the fluent material is above a second predetermined level higher than said first predetermined level;
    said detector circuit produces one of said first and second operating signals when said fluent material is between said first and second predetermined levels, the determination of the operating signal to be produced being dependent upon the immediate past history of the level of the fluent material.

3. The apparatus recited in claim 2, wherein:
    said bridge circuit further includes a high level electrode and a low level electrode in said container, said electrodes being electrically insulated from said container walls and being adapted to make contact with the fluent material within said container;
    said first predetermined level being below said low electrode so that neither electrode makes contact with said fluent material, said second predetermined level being at least as high as said high electrode so that both electrodes make contact with said fluent material.

4. The apparatus recited in claim 3, wherein:
    said bridge circuit is balanced and has substantially no output voltage when said low electrode is immersed in the fluent material and said high electrode is above the level of the fluent material;
    said bridge circuit is unbalanced and produces a first output voltage of such polarity as to cause said detector circuit to produce said first operating signal when the level of the fluent material is below both of said high and low level electrodes;

said bridge circuit is unbalanced and produces a second output voltage opposite in polarity to said first output voltage so as to cause said detector circuit to produce said second operating signal when both of said electrodes are in contact with the fluent material.

5. The apparatus recited in claim 4, and further comprising:
a relay, the coil of which is included in said detector circuit and the contacts of which are included in said power control means;
said detector circuit and bridge circuit including said container being effectively electrically isolated from said power applying means, said power control means and said level adjusting means by said transformer and said relay.

6. The apparatus recited in claim 5, wherein:
said detector circuit includes a silicon controlled rectifier having its gate connected to one output terminal of said bridge circuit;
said relay coil being connected between said centertap on said transformer output windings and the cathode of said silicon controlled rectifier;
said detector circuit further including a feedback circuit connected between said transformer centertap and said gate of said silicon controlled rectifier;
whereby said first output voltage of said bridge circuit applied to said gate triggers said silicon controlled rectifier into a conducting state energizing said relay coil and producing said first operating signal, said feedback circuit maintaining said silicon controlled rectifier in a conducting state when said bridge circuit becomes balanced after producing said output voltage; and
whereby said second output voltage of said bridge circuit applied to said silicon controlled rectifier gate overrides the feedback circuit signal applied to said gate and causes said silicon controlled rectifier to cease conducting, thereby deenergizing said relay coil and producing said second operating signal.

7. The apparatus recited in claim 6, wherein:
said power control means and said level adjusting means are connected in series across said input windings of said transformer.

8. The apparatus recited in claim 7, wherein:
said relay contacts open in response to one of said detecting circuit operating signals and close in response to the other of said operating signals.

9. The apparatus recited in claim 8, wherein:
said power control means comprises a bidirectional alternating current switch connected in parallel with a series combination of a triggering resistor and a capacitor, the gate of said switch being connected through said relay contacts to the junction of said triggering resistor and said capacitor;
whereby said switch is triggered into a conducting state when said relay contacts are closed and power is thereby supplied to said level adjusting means to cause the fluent material level in said container to change;
said switch being in a nonconducting state when said relay contacts are open, power thereby being prevented from operating said level adjusting means.

10. The apparatus recited in claim 6, wherein:
the anode of said silicon controlled rectifier is connected to the output winding of said transformer, said silicon controlled rectifier being conductive during one-half of each cycle of the alternating current applied to said anode when a voltage sufficient to trigger said silicon controlled rectifier is applied to said gate;
said detector circuit includes a first capacitor in parallel with said relay coil, said first capacitor being adapted to be charged during each conductive half-cycle and to maintain said relay coil continuously energized during each nonconductive half-cycle of said silicon controlled rectifier.

11. The apparatus recited in claim 10, wherein:
said feedback circuit includes a second capacitor, the time constant of said feedback circuit being longer than the time constant of the relay coil circuit;
whereby said relay coil is energized upon the production of said first output voltage by said bridge circuit and continues to be energized until said second output voltage is produced by said bridge circuit.